2,770,029

COMPOSITE ELECTRICAL RESISTOR

Herbert F. G. Ueltz, Worcester, Mass., assignor to Norton Company, Worcester, Mass., a corporation of Massachusetts No Drawing. Application June 2, 1952,
Serial No. 291,327

1 Claim. (Cl. 29—182.2)

This invention relates to refractory alloys.

One object of the invention is to provide an alloy particularly useful for the manufacture of components of jet propulsion engines. Another object of the invention is to provide an electrical resistance alloy capable of being used at high temperatures. Another object of the invention is to provide a highly refractory material which is not too brittle for many practical applications. Another object of the invention is to provide an alloy useful for the manufacture of parts of guided missiles and of rockets. Another object of the invention is to provide an alloy of the nature indicated which is quite resistant to oxidation at high temperatures.

Other objects will be in part obvious or in part pointed out hereinafter.

My alloy comprises the elements molybdenum, Mo, silicon, Si, and nickel, Ni. My alloy has at least 31% molybdenum, at least 18% silicon and at least 10% nickel, all percentages hereinbefore and hereinafter being by weight. So far as practicable I make the alloy entirely of molybdenum disilicide, $MoSi_2$, and nickel but it can have permissible impurities up to 2% of iron group metal other than nickel and it can have permissible other impurities limited to not more than 2%. At least 80% of the elements Mo and Si in my alloy are present as $MoSi_2$. From the foregoing statement it follows that in my alloy there is total molybdenum, silicon and nickel to the extent of at least 96% but of this total at least 80% of the total molybdenum and silicon are present in the combined state as indicated.

Articles are preferably made of the alloy by the powder metallurgy technique. I provide molybdenum disilicide powder and nickel powder. The nickel powder is preferably carbonyl nickel powder which is quite pure. These powders in the desired proportions can be mixed with a temporary binder consisting of a solution of stearic acid in carbon tetrachloride but many other temporary binders can be used, such as various waxes, dextrine and water.

*Example I*

Ninety parts of molybdenum disilicide were mixed with 10 parts of carbonyl nickel powder, the parts being by weight, and the mixture was ground and thoroughly mixed in a mortar and then moistened with a 10% solution of stearic acid in carbon tetrachloride. A quantity of the resultant mixture was placed in a mold and pressed at a pressure of 40,000 pounds per square inch. The pressed piece was removed from the mold and sintered in purified hydrogen at a temperature of 1550° C. for five minutes. The resultant article was far less brittle than molybdenum disilicide and yet it was almost as resistant to oxidation and would withstand temperatures up to 1300° C.

*Example II*

Sixty parts of molybdenum disilicide were mixed with 40 parts of carbonyl nickel powder, the parts being by weight, the mixture was ground and further mixed as in Example I, and then moistened with a 10% solution of stearic acid in carbon tetrachloride. A quantity of the resultant mixture was placed in a mold and pressed at a pressure of 40,000 pounds per square inch. The pressed piece was removed from the mold and sintered in purified hydrogen at a temperature of 1480° C. for five minutes. The resultant article was even less brittle than the article of Example I, was also quite resistant to oxidation and would also withstand temperatures up to 1200° C.

The articles made according to Examples I and II were dense homogeneous articles, and by dense I mean that porosity was less than one percent.

Instead of pressing the powders cold or at low temperatures and thereafter sintering in the absence of any pressure or at low pressure, I may hot press the articles, that is to say I may apply the heat and pressure simultaneously. Or I may hot press the articles at full pressure but at an intermediate temperature and thereafter sinter them at the top temperature without pressure. The top temperature of sintering or hot pressing should be at least 1000° C. I do not know of any circumstances where it would be desirable to hot press or to sinter at above 1600° C. so the upper limit of temperature can be taken to be about 1600° C. Pieces made at sintering or hot molding temperatures below 1000° C. are apt to be somewhat porous and therefore are apt to be of inferior grade for the purposes mentioned. With regard to the pressure to be used, it can be very much less where the articles are simultaneously heated, that is to say using the hot pressing method of manufacture, but even in such cases should be at least about 500 pounds to the square inch. When the cold molding technique is used pressures of at least about 6000 pounds per square inch should be used. There is no detriment in any case in raising the pressure as the final article will be useful for the purposes indicated no matter how high the pressure but of course certain molds will withstand only so much and no more. For example the most practical readily available hot molding apparatus is a graphite tube furnace with pressure apparatus, for example according to U. S. Patent No. 2,125,588 granted on application of R. R. Ridgway and in such a tube furnace pressures above 2,500 pounds per square inch are rarely used because of the danger of breaking the expensive graphite tube. If an induction tube furnace is used higher pressures can be employed because tubes or sleeves with much thicker walls can be used.

If the pieces are hot pressed no special atmosphere need be used, that is to say the mold need not be enclosed and surrounded with a particular atmosphere. However if graphite molds are used or if a graphite tube furnace or induction furnace is used, the atmosphere will be reducing to wit carbon monoxide. When the pieces are cold pressed they should be thereafter sintered in a protective atmosphere of some kind. In the examples hydrogen has been mentioned but other non-oxidizing or inert gases might be used, for example carbon monoxide which has been mentioned or argon or helium, the latter two being of course completely inert.

Because of the shortcomings of resistors of recrystallized silicon carbide, there is a great demand for a material which is resistant to oxidation as well as refractory. My composition is such a material. My composition will resist oxidation for many hours of use at 1200° C. and is far superior to most metals in this respect. Having a much lower resistivity than silicon carbide, the resistors can have a much smaller cross section, thus cutting down the unit mass per resistor, while the relative lack of brittleness compared to silicon carbide is a distinct advantage since a great number of silicon carbide resistors are broken by handling rather than burned out.

A practical resistor made out of my composition might have a central portion of from 85% to 90% molybdenum, silicon and molybdenum disilicide, the remainder (except for the impurities) nickel, while the cold ends might be from 50% to 60% molybdenum, silicon and molybdenum disilicide, the remainder (except for the impurities) nickel. Thus, since the cold ends are usually short compared to the central portion, a very high percentage of the voltage drop would occur in the central heating portion of the resistor and the cold ends could extend outside of the heater and have metal clamps thereon for connection in the electrical circuit. Such a resistor can readily be molded in one piece.

There has long been a search for a composition for turbine blades for jet engines from which blades having longer life than present blades can be made. Various ceramics have been tried but most of them have been so brittle as to be useless, for the turbine blades must be securely clamped in the rotor and furthermore a blade which cannot be readily handled is impractical. My composition, which is thermally conductive, will withstand heat shock, is less brittle than pure oxides in general, and is more resistant to oxidation than metals now used and hence is an excellent composition for turbine blades and other components of jet engines, as well as for nozzles and tubes and other components of guided missiles and rockets.

It will thus be seen that there has been provided by this invention a refractory alloy in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

A dense integral electrical resistor having a porosity of less than 1%, and having a central portion consisting of 85% to 90% molybdenum, silicon and molybdenum disilicide, the remainder mainly nickel, said resistor having cold ends consisting of from 50% to 60% molybdenum, silicon and molybdenum disilicide, the remainder mainly nickel, the entire resistor having a composition consisting of the elements molybdenum, silicon and nickel to the extent of at least 96%, at least 80% of the total molybdenum and silicon being present as molybdenum disilicide, both the central portion and in the cold ends having at least 31% molybdenum, at least 18% silicon and at least 10% nickel, there being not more than 4% of elements other than said molybdenum, silicon and nickel in the central portion and in the cold ends, and of said elements other there being not more than 2% of the central portion and not more than 2% of the cold end elements of the iron group other than nickel, all percentages being by weight.

References Cited in the file of this patent

UNITED STATES PATENTS

| | | |
|---|---|---|
| 1,993,598 | De Bats | Mar. 5, 1935 |
| 2,116,399 | Marth | May 3, 1938 |
| 2,455,751 | Gagnebin et al. | Dec. 7, 1948 |
| 2,665,474 | Beidler et al. | Jan. 12, 1954 |